United States Patent
Nieuwoudt et al.

(10) Patent No.: US 10,953,374 B2
(45) Date of Patent: Mar. 23, 2021

(54) CONTACT TRAY HAVING PICKETED LIQUID FLOW BARRIERS AND METHOD INVOLVING SAME

(71) Applicant: KOCH-GLITSCH, LP, Wichita, KS (US)

(72) Inventors: Izak Nieuwoudt, Wichita, KS (US); Charles A. Griesel, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 454 days.

(21) Appl. No.: 15/855,607

(22) Filed: Dec. 27, 2017

(65) Prior Publication Data

US 2018/0178172 A1 Jun. 28, 2018

Related U.S. Application Data

(60) Provisional application No. 62/439,593, filed on Dec. 28, 2016.

(51) Int. Cl.
*B01D 3/32* (2006.01)
*B01F 3/04* (2006.01)
(Continued)

(52) U.S. Cl.
CPC .......... *B01F 3/04078* (2013.01); *B01D 3/163* (2013.01); *B01D 3/22* (2013.01);
(Continued)

(58) Field of Classification Search
CPC .................................. B01D 3/20; B01D 3/324
(Continued)

(56) References Cited

U.S. PATENT DOCUMENTS 1,803,854 A 5/1931 Kniskern
2,713,478 A * 7/1955 Ragatz ..................... B01D 3/22
261/114.1
(Continued)

FOREIGN PATENT DOCUMENTS

DE 102010026523 A1 * 1/2012 ............. B01D 3/225
DE 102010026523 A1 1/2012
(Continued)

OTHER PUBLICATIONS

Translation of Alzner, Gerhard and Zander, Hans-joerg (DE 102010026523), published Jan. 12, 2012. Translation retrieved Apr. 2020 (Year: 2012).*
(Continued)

*Primary Examiner* — David L Sorkin (57) ABSTRACT

A contact tray for use in a mass transfer or heat exchange column and having a tray deck with an inlet area and a remotely positioned outlet for respectively receiving liquid on the tray deck and then removing the liquid after it has flowed across the tray deck and interacted with another fluid on and above the tray deck. A plurality of barriers are positioned between the inlet area and the outlet. The barriers each have spaced-apart pickets and openings in the spacing between adjacent ones of the pickets. The pickets impede the flow of the liquid and increase the upstream liquid loading on the tray deck as the liquid flows from the inlet area, through the openings, and then into the outlet. At low liquid flow rates, this increase in the liquid loading may significantly increase the vapor handling capacity of the tray.

21 Claims, 5 Drawing Sheets

(51) Int. Cl.
  *B01D 53/18* (2006.01)
  *B01D 3/16* (2006.01)
  *B01D 3/22* (2006.01)

(52) U.S. Cl.
  CPC ............... *B01D 3/32* (2013.01); *B01D 3/324* (2013.01); *B01D 53/18* (2013.01); *B01F 3/04496* (2013.01)

(58) Field of Classification Search
  USPC .......................................................... 366/340
  See application file for complete search history.

(56) References Cited

U.S. PATENT DOCUMENTS

| | | | |
|---|---|---|---|
| 2,926,754 A * | 3/1960 | Ragatz | ................... B01D 3/22 95/150 |
| 3,445,094 A | 5/1969 | Shobe | |
| 3,517,486 A | 6/1970 | Golden | |
| 3,969,194 A | 7/1976 | Mende | |
| 4,547,326 A | 10/1985 | Weiler | |
| 6,852,146 B2 | 2/2005 | Holmes et al. | |
| 7,618,472 B2 | 11/2009 | Agnello et al. | |
| 8,444,732 B2 | 5/2013 | Bratton | |
| 8,888,076 B2 | 11/2014 | Tamminen et al. | |
| 2013/0113128 A1 | 5/2013 | Alzner | |

FOREIGN PATENT DOCUMENTS

| | | |
|---|---|---|
| EP | 0001448 A1 | 4/1979 |
| JP | 2012500109 A | 1/2012 |
| KR | 20010012453 A | 2/2001 |
| KR | 20110044837 A | 5/2011 |

OTHER PUBLICATIONS

International Search Report & Written Opinion for corresponding PCT application No. PCT/IB2017/058445, 10 pages.
Notice of Allowance received for KR application No. 10-2019-7015563, dated Dec. 24, 2020, 3 pages. (1 page of English translation and 2 pages of Official copy).

* cited by examiner

CONTACT TRAY HAVING PICKETED LIQUID FLOW BARRIERS AND METHOD INVOLVING SAME

BACKGROUND OF THE INVENTION

The present invention relates generally to columns in which mass transfer and heat exchange occur and, more particularly, to contact trays for use in such columns to facilitate interaction between fluid streams flowing within the columns and to a method of using the contract trays for mass transfer and/or heat exchange.

Mass transfer columns are configured to contact at least two incoming fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along multiple trays or other mass transfer surfaces disposed within the column.

Various types of trays are commonly used in mass transfer columns to promote the desired contact and mass transfer between ascending and downwardly flowing fluid streams. Each tray normally extends horizontally across substantially the entire horizontal cross section of the column and is supported around its perimeter by a support ring welded to the inner surface of the circular column wall or shell. A number of trays are positioned in this manner with a uniform vertical spacing between adjacent trays. The trays may be located in only a portion of the column to perform one part of a multi-step process occurring with the column. Alternatively, the trays may occupy substantially the entire vertical height of the column.

Trays of the type described above contain one or more downcomers that are positioned at outlet openings in the tray deck to provide passageways for liquid to descend from one tray to an adjacent lower tray. Prior to entering the downcomer, the liquid on the tray deck interacts with ascending vapor that passes through apertures provided in selected portions of the tray deck and then flows over an outlet weir into the outlet opening on the tray deck. Those areas of the tray deck containing vapor apertures are commonly referred to as "active" areas because of the vapor and liquid mixing and frothing that occurs above those areas of the tray.

Under low liquid flow rates, such as rates that produce a liquid load at the outlet weir of less than 25 U.S. gallons per minute per horizontal foot of the outlet weir (25 gpm/ft), significant portions of the liquid flowing across the active area of the tray may become entrained as droplets in the ascending vapor and be carried with the vapor to the overlying tray. The smaller entrained droplets may be carried with the vapor through the vapor apertures in the overlying tray deck, while the larger droplets may impact against and form a film on the undersurface of the overlying tray deck. Portions of the film may then be carried by the vapor through the vapor apertures in the overlying tray. As this entrained liquid is carried by the vapor through the vapor apertures, it restricts the cross-sectional area available for vapor flow and increases the pressure drop across the tray. The entrained liquid also bypasses the desired interaction with vapor on the lower tray and leads to reduced operating efficiencies.

A current approach to attempt to reduce the entrainment of the liquid and thereby increase the vapor handling capacity of the tray at low liquid flow rates involves the use of what is commonly known as a picketed outlet weir. The picketed outlet weir has a plurality of upstanding pickets that are spaced apart to form openings in the spacing between adjacent pickets. The pickets impede the flow of liquid into the outlet opening on the tray deck and have been thought to increase the liquid load on the tray deck and the vapor handling capacity of the tray.

SUMMARY OF THE INVENTION

The present inventors have discovered, however, that the picketed outlet weir under many process conditions only increases the liquid load on a portion of the tray deck upstream from the picketed outlet weir and thus has significantly reduced impact on the vapor handling capacity of the tray than has been conventionally believed.

A need has thus developed for an improved tray that increases the vapor handling capacity of the tray during low liquid flow rates.

In one aspect, the present invention is directed to a tray for use in a mass transfer column to facilitate interaction between fluids when they are flowing within the mass transfer column. The tray comprises a tray deck having an upper surface, an inlet area on the tray deck for receiving a downward flow of liquid onto the upper surface of the tray deck, a plurality of apertures distributed across an area of the tray deck and extending through the tray deck to permit upward passage of fluid through the tray deck for interaction with the liquid after it leaves the inlet area and flows across and above the area of the tray deck on which the apertures are distributed, an outlet positioned remotely from the inlet area on the tray deck for allowing removal of liquid from the upper surface after it has flowed from the inlet area and interacted with the fluid passing upwardly through the apertures in said area, a downcomer extending downwardly from the outlet to receive liquid when it enters the outlet and then convey it downwardly, and a plurality of barriers positioned between the inlet area and the outlet and extending upwardly from the upper surface of the tray deck and across a flow path of the liquid when it flows from the inlet area to the outlet. Each of the barriers comprises pickets for impeding the flow of the liquid as it flows from the inlet area to the outlet. Adjacent ones of the pickets are spaced apart to form openings in the spacing between the adjacent ones of the pickets for allowing passage of the liquid successively through the barriers as it flows from the inlet area to the outlet. One of the barriers may be positioned adjacent the outlet and function as an outlet weir.

In another aspect, the present invention is directed to a mass transfer column comprising a shell, an open internal region within the shell, and a plurality of trays described above positioned in vertically spaced-apart relationship within and extending across a cross-section of the open internal region of the column.

In a further aspect, the present invention is directed to a method of interacting fluids on and above an upper surface of the tray deck of the trays described above when positioned in vertically spaced-apart relationship within a mass transfer column and extending across a cross section of an open internal region formed by a shell of the mass transfer column. The method comprises the steps of delivering a liquid onto the inlet area of each of the trays and allowing it to flow along and above the upper surface of the tray deck along a flow path from the inlet area, through the openings in the spacing between adjacent ones of the pickets, and then into the outlet, wherein the pickets impede said flow of the liquid and increase liquid loading on the tray deck upstream from the pickets, causing a vapor to ascend through the apertures in the tray deck to interact with the liquid as it flows along the flow path, removing the liquid from the tray deck at the end of its flow path by directing it through the outlet and into the downcomer; and then discharging the liquid from the downcomer onto the inlet area of an adjacent underlying one of the trays. In one embodiment of the method, the liquid flows at a flow rate to produce an outlet weir load of less than 25 gpm/ft.

BRIEF DESCRIPTION OF THE DRAWINGS

In the accompany drawings that form part of the specification and in which like reference numerals are used to indicate like components in the various views.

DETAILED DESCRIPTION

Figure 1:
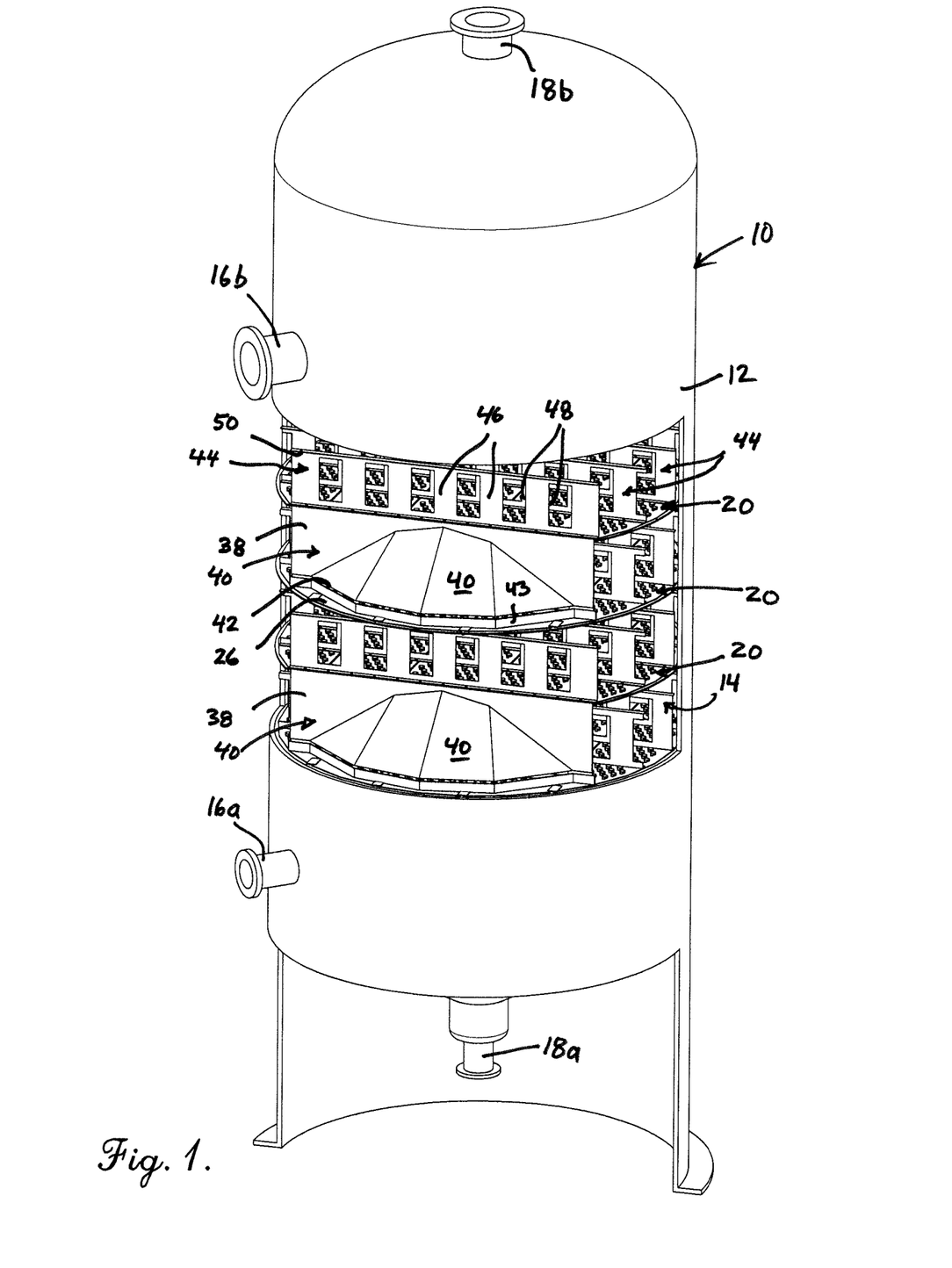
FIG. 1 is a fragmentary, perspective view of a column in which mass transfer and/or heat exchange are intended to occur and in which a portion of a shell of the column is broken away to show one embodiment of trays of the present invention.
Figure 2:
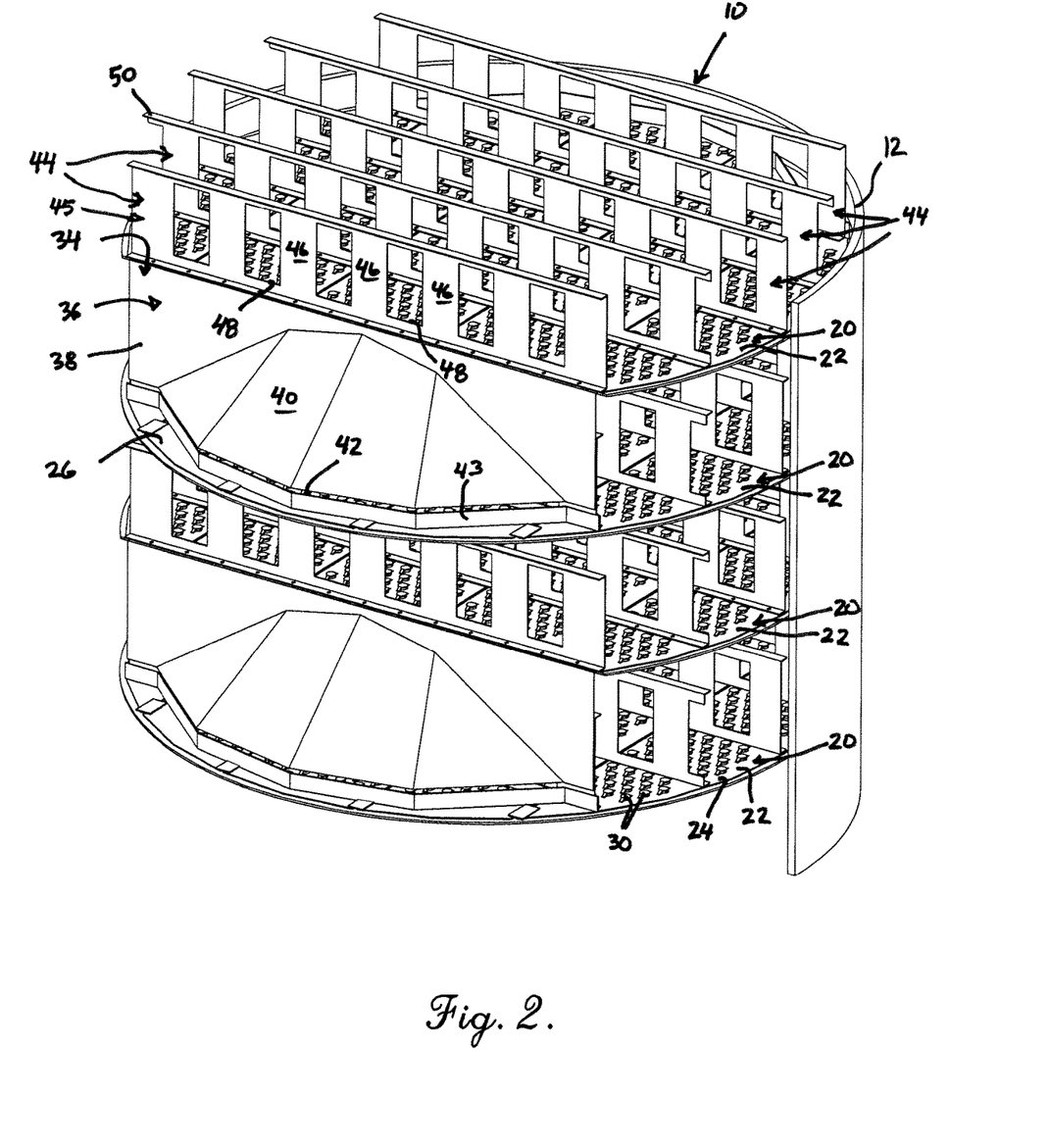
FIG. 2 is an enlarged, fragmentary view of a portion of the column shown in FIG. 1 and taken from a right end perspective.
Figure 3:
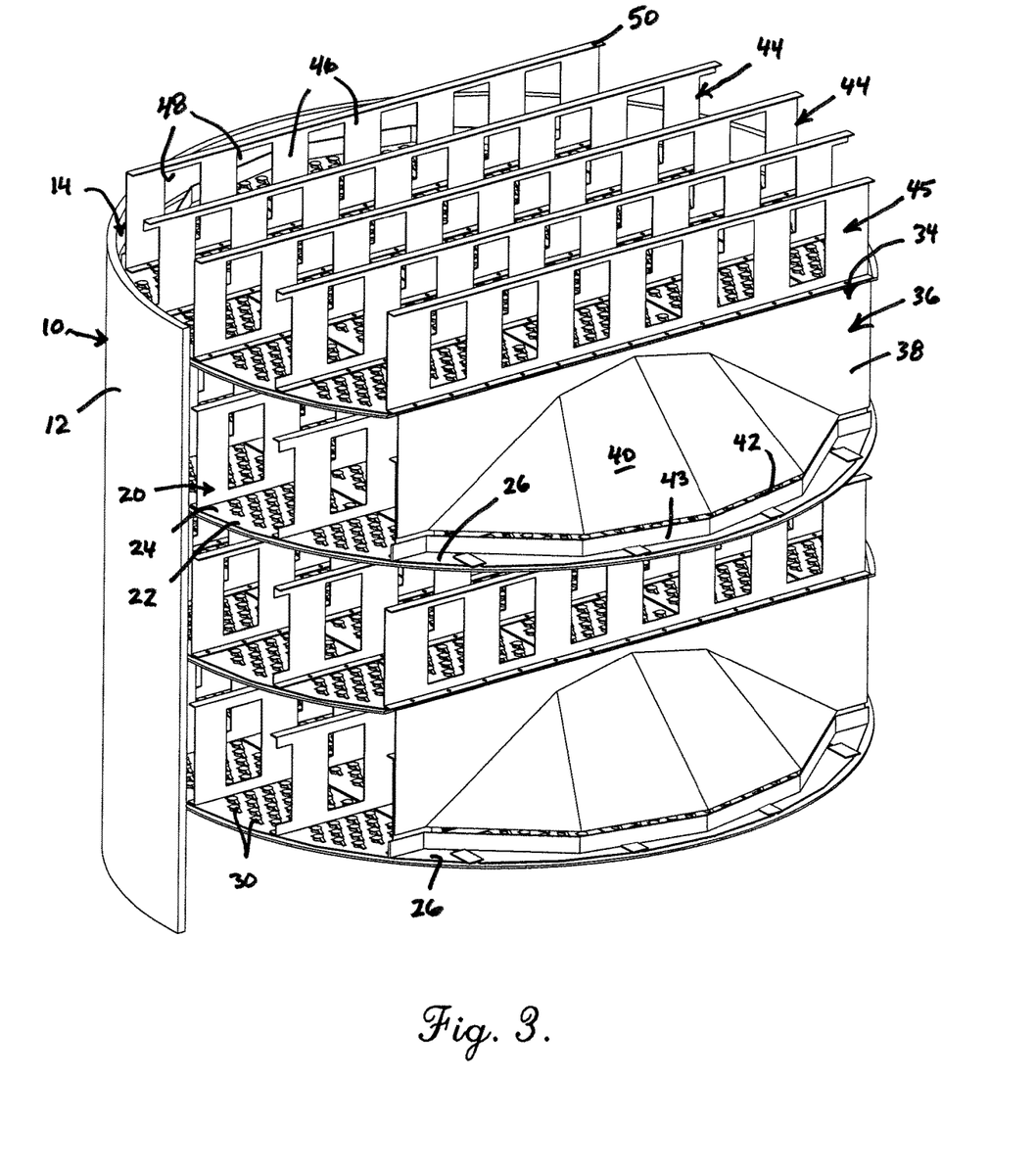
FIG. 3 is an enlarged, fragmentary view similar to FIG. 2, but taken from a left end perspective.
Figure 4:
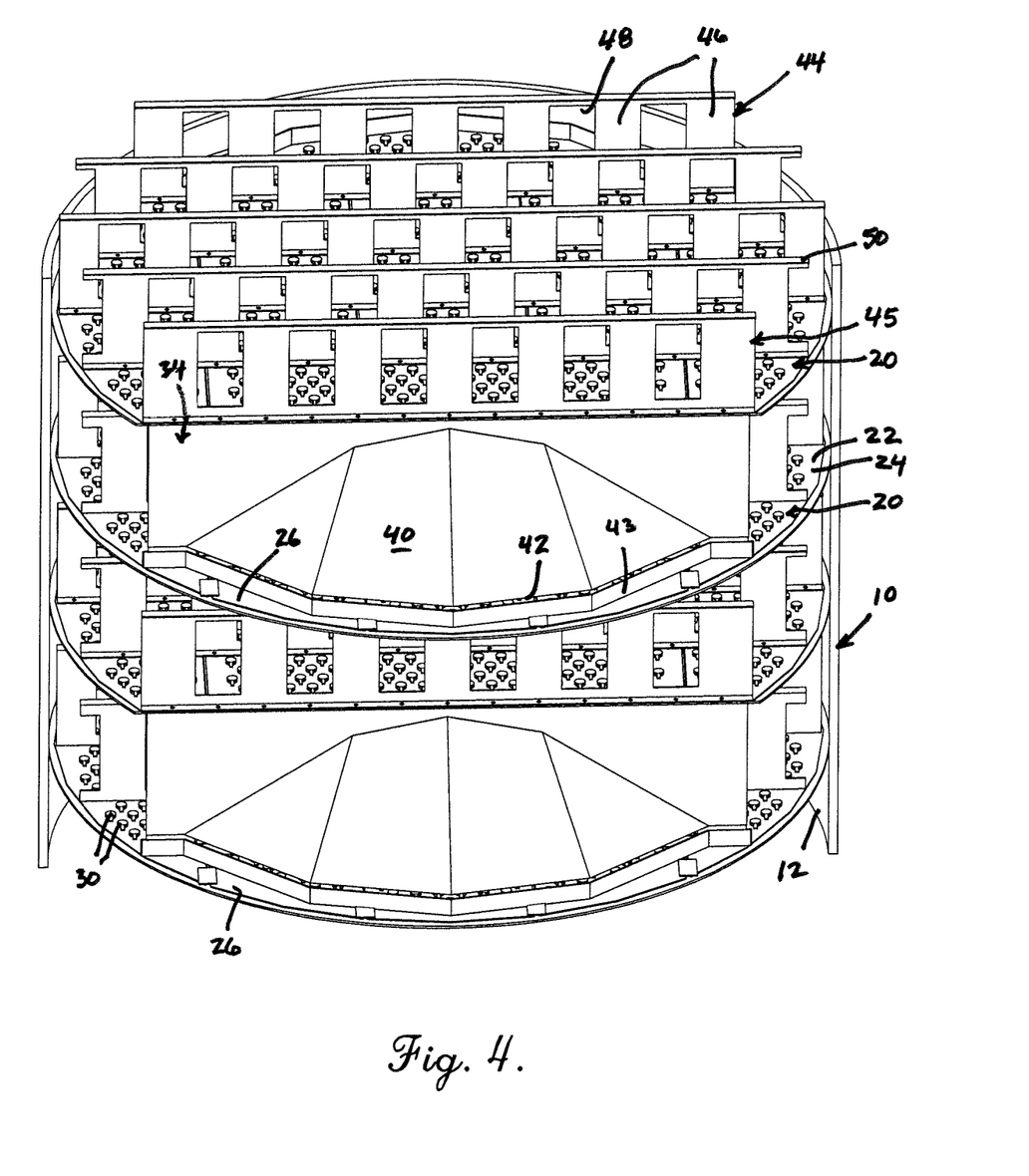
FIG. 4 is an enlarged, fragmentary view similar to FIGS. 2 and 3, but taken from an end perspective.

Turning now to the drawings in greater detail and initially to FIG. 1, a mass transfer column suitable for use in mass transfer or heat exchange processes is represented generally by the numeral 10. The column 10 includes an upright, external shell 12 that may be generally cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the column 10.

The column 10 is of a type used for processing fluid streams, typically liquid or vapor streams, to obtain fractionation products or to otherwise cause mass transfer or heat exchange between the fluid streams. For example, the column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the column 10 through any number of feed lines 16, such as lower feed lines 16a or upper feed lines 16b, positioned at appropriate locations along the height of the column 10. In one implementation, vapor streams may be generated within the column 10 rather than being introduced into the column 10 through the feed lines 16a, 16b. One or more fluid streams may be directed out of the column 10 through any number of takeoff lines 18, such as lower takeoff line 18a and upper takeoff line 18b. In one implementation, liquid may be introduced through upper feed line 16b, descend through the column 10, and be removed through lower takeoff line 18a, while vapor may be introduced through lower feed line 16a, ascend through the column 10, and be removed through upper takeoff line 18b.

Other column components that would typically be present, such as reflux stream lines, reboilers, condensers, vapor horns, liquid distributors, and the like, are not illustrated in the figures because they are conventional in nature and an illustration of these components is not believed to be necessary for an understanding of the present invention.

Turning additionally to FIGS. 2-5, a plurality of contact trays 20 are positioned in vertically spaced-apart relationship within the open internal region 14 of the column 10 to facilitate interaction of the fluids flowing within the open internal region 14. The trays 20 are generally of the same or similar construction and extend generally horizontally across the entire cross-section of the column 10. Adjacent trays 20 in the illustrated embodiment are rotated 180 degrees with respect to each other about a center, vertical axis.

Each tray 20 has a generally planar tray deck 22 with an upper surface 24 along which fluids flow, as described in more detail below. When the shell 12 of the column 10 is cylindrical, the tray deck 22 has an outer perimeter that lies along portions of a circle. The tray deck 22 is normally formed from interconnected tray panels that are each sized to fit through a manway (not shown) in the shell 12. An inlet area 26 is positioned on the tray deck for receiving a downward flow of liquid onto the upper surface 24 of the tray deck 22, such as from an overlying tray 20 or from a liquid distributor (not shown). A plurality of apertures 28 (FIG. 5) are distributed across an area, known as the active area, of the tray deck 22. The apertures 28 extend completely through the tray deck 22 to permit fluid to pass upwardly through the tray deck 22 for interaction with the liquid after it leaves the inlet area 26 and flows across and above the active area of the tray deck 22 on which the apertures 28 are distributed. The apertures 28 may be simple sieve holes, or they may form part of a fixed or moveable valve. In the illustrated embodiment, the apertures 28 form part of a valve 30 having a fixed valve cover 32. In another embodiment, the valve cover is able to float up and down in response to the force exerted by the upward flow of fluid, such as a vapor, through the apertures 28. One of the valve covers 32 is removed in FIG. 5 to show the aperture 28 that is associated with one of the valves 30.

Figure 5:
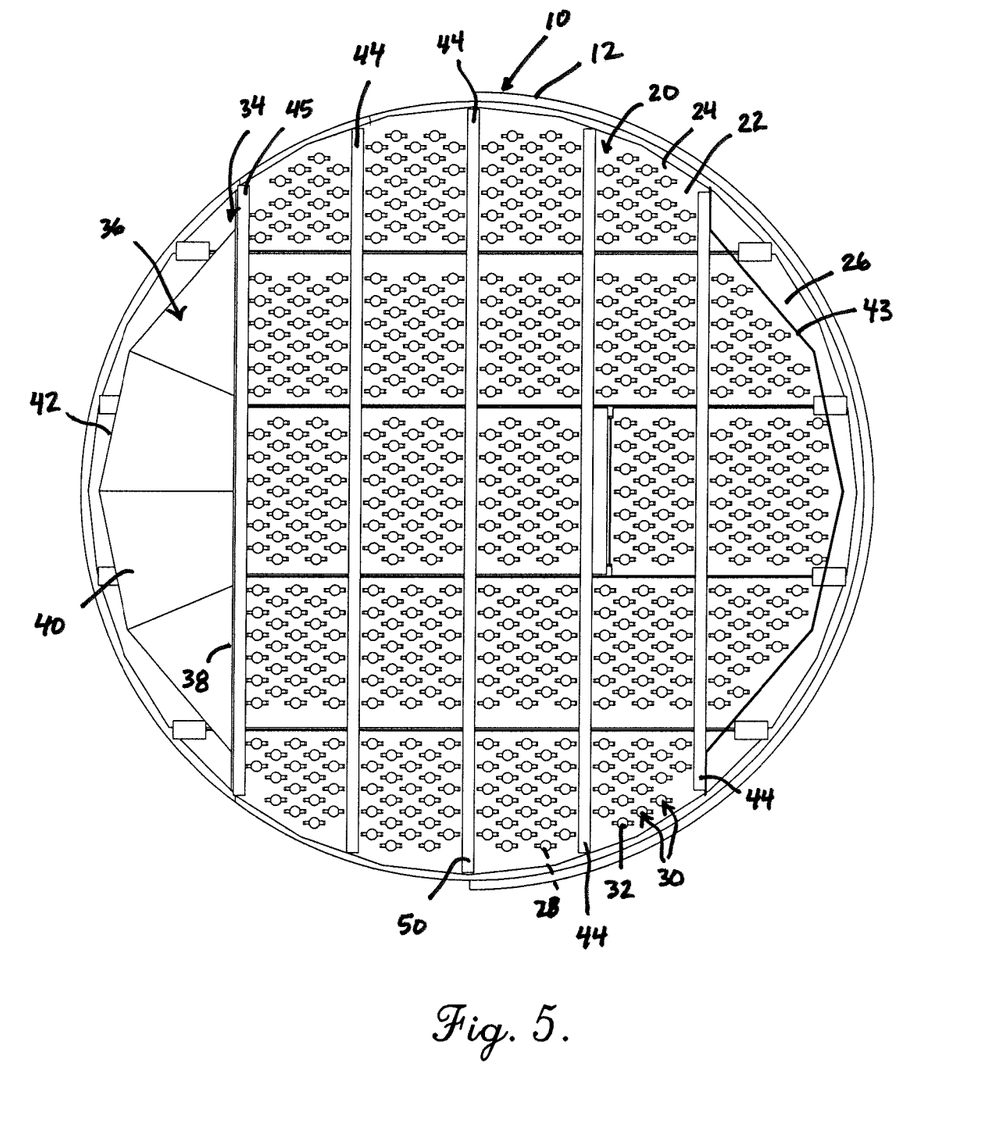
FIG. 5 is a top plan view of the column showing one of the trays shown in FIGS. 1-4.

Each tray 20 further includes an outlet 34 positioned in the tray deck 22 remotely from the inlet area 26 for allowing removal of liquid from the upper surface 24 of the tray deck 22 after it has flowed from the inlet area 26 and interacted with the fluid passing upwardly through the apertures 28 in the active area of the tray deck 22. The interaction between the vapor ascending through the apertures 28 and the liquid flowing along the upper surface 24 of the tray deck 22 typically produces a froth or a spray above the tray deck 22.

Each tray 20 also includes a downcomer 36 that extends downwardly from the outlet 34 to receive liquid when it enters the outlet 34. The downcomer 36 then conveys the liquid downwardly for discharge onto the inlet area 26 of the adjacent underlying tray 20 or, in the case of the lowermost tray 20, to a liquid collector (not shown) or other internal device. The downcomer 36 in the illustrated embodiment is a side downcomer in that it is located at an end of the tray deck 22 on one of the trays 20 and at an opposite end of the tray decks 22 on the adjacent ones of the trays 20 to create a "single-pass" flow path in which the liquid flows in only one direction on each tray 20 and in opposite directions on adjacent ones of the trays 20. The downcomer 36 includes a downcomer wall 38 that extends chordally from opposite sides of the tray deck 22 and shell 12. The downcomer wall 38 can be straight, as illustrated, or sloped and/or stepped to provide a constricted lower discharge outlet. Other downcomer wall 38 constructions can be used, such as multi-chordal or sweptback. The downcomer wall 38 may include a multi-chordal skirt 40 that is inclined toward the shell 12 to provide a constricted downcomer discharge outlet 42. An inlet weir 43 may be provided adjacent the discharge outlet 42. Although not illustrated, each tray 20 may include additional ones of the downcomers 36, and additional ones of the inlet areas 26 and outlets 34, to create multiple-pass flow paths in which the liquid flows in more than one direction on each tray 20. For example, some of the additional downcomers 36 may be center or off-center chordal downcomers that each have two of the downcomers walls 38 that extend in a chordal or other fashion from opposite sides of the tray deck 22 and shell 12.

As can best be seen in FIG. 5, in the illustrated single-pass tray 20 embodiment, the inlet area 26 and the outlet 34 are located at opposite ends of the tray deck 22. On adjacent ones of the trays 20, the positions of the inlet area 26 and outlet 34 are reversed so that the liquid flowing from the discharge outlet 42 of the downcomer 38 flows downwardly onto the inlet area 26 of the next lower tray 20. In multi-pass flow embodiments, the inlet areas 26 are likewise located to receive the liquid discharged from the downcomers 38 associated with the overlying tray 20. The inlet area 26 and the outlet 34 are each sized to accommodate the designed volumetric flow rate of liquid on the trays 20.

Returning additionally to FIGS. 1-4, in accordance with the present invention a plurality of barriers 44 are positioned between each one of the inlet areas 26 and the associated outlet 34 that receives liquid from the inlet area 26. The barriers 44 extend vertically upwardly from and may be secured to the upper surface 24 of the tray deck 22 by bolting, welding or other suitable methods. In one embodiment, the barriers 44 have a height that is at least one-half of the vertical spacing between adjacent ones of the tray decks 22. In another embodiment, the barriers 44 are at least three-quarters of such vertical spacing.

The barriers 44 are typically positioned parallel to each other and transversely across the flow path of the liquid flowing from the inlet area(s) 26 to the outlet(s) 34. One of the barriers 44 may be positioned adjacent the outlet 34 and along its upstream edge to function as an outlet weir 45. The barrier 44 that functions as the outlet weir 45 may, in one embodiment, be formed as a vertical extension of the downcomer wall 38. The barriers 44 may typically be formed from sheet material, such as various metals or alloys. Each barrier 44 may be planar and extend as a chord from the opposite sides of the tray deck 22. Alternatively, the barriers 44 may be multi-chordal, curved or other configurations.

Each of the barriers 44 includes pickets 46 for impeding the flow of the liquid as it flows from the inlet area 26 to the associated outlet 34. Adjacent ones of the pickets 46 are spaced apart along some or all of their height to form openings 48 in the spacing between the adjacent ones of the pickets 46. These openings 48 allow the liquid to pass through the barriers 44 as it flows from the inlet area 26 to the outlet 34. The pickets 46 may be square, rectilinear or other shapes in whole or in part and of uniform size. The openings 48 may similarly shaped and of uniform size. Other constructions are possible for both the pickets 46 and openings 48. The pickets 46 and the openings 48 respectively occupy preselected portions of the longitudinal length of each barrier 44. As an example, the pickets 46 may occupy 30-70% or 40-60% of the longitudinal length of each barrier 44.

In the illustrated embodiment, the pickets 46 are interconnected at their top and bottom regions so that each barrier 44 is formed as a continuous strip of material. A top edge of each barrier 44 may be bent to form a stiffening flange 50. In another embodiment suitable for applications where fouling of the barriers 44 is of concern, the pickets 46 are interconnected along their top regions but not along their bottom regions so that the openings 48 extend downwardly to the upper surface 24 of the tray deck 22.

The pickets 46 in adjacent ones of the barriers 44 may be staggered or offset from each other so that the liquid may not flow in a straight flow path from the inlet area 26 to the outlet 34, but must instead navigate around the pickets 46 as it flows through the openings 48 in successive barriers 44.

The number of barriers 44, the spacing between adjacent ones of the barriers 44, and the percentage of the length of each barrier 44 that is occupied by pickets 46 are selected based on the intended operating conditions for the trays 20. In general, the spacing between adjacent barriers 44 may be between 6 and 14 inches or between 8 and 12 inches.

When multiple ones of the barriers 44 spaced apart as described above are used, meaningful increases in the vapor handling capacity of the tray 20 may be achieved when the flow rate of the liquid along the tray deck 22 is less than 25 U.S. gallons per minute per horizontal foot (gpm/ft) of the outlet weir 45. In one embodiment, the use of multiple barriers 44 with outlet weir loadings of less that 10 gpm/ft results in even more significant percentage increases in the vapor handling capacity of the trays 20.

The present invention is also directed to a method of interacting fluids on and above the upper surface 24 of the tray deck 22 of the trays 20 when they are positioned in vertically spaced-apart relationship within the mass transfer column 10 and extend across a cross section of the open internal region 14 formed by the shell 12 of the mass transfer column 10. The method comprising the steps of delivering a liquid onto the inlet area 26 of each of the trays 20 and allowing it to flow along and above the upper surface 24 of the tray deck 22 along a flow path from the inlet area 26, through the openings 48 in the spacing between adjacent ones of the pickets 46 in the barriers 44, and then into the outlet 34. The pickets 46 operate to impede the flow of the liquid and increase the liquid loading on the tray deck 22 upstream from the pickets 46. As the liquid is flowing along the tray deck 22, a fluid that is typically vapor ascends through the apertures 28 or valves 30 in the tray deck 22 to interact with the liquid as it flows along the flow path. Because the pickets 46 increase the liquid loading on the tray deck 22, a froth rather than a spray is more likely to form by the interaction of the vapor with the liquid. The liquid is removed from the tray deck 22 at the end of its flow path by directing it through the outlet 34 and into the downcomer 36. The liquid is then discharged from the downcomer 36 onto the inlet area 26 of an adjacent underlying one of the trays 20. Meaningful reductions in liquid entrainment and increases in vapor handling capacity of the trays 20 may result from use of the multiple barriers 44 at low liquid flow rates, such as liquid flow rates producing outlet weir loadings of less than 25 gpm/ft of the length of the outlet weir 45 and, more particularly, less than 10 gpm/ft.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A tray for use in a mass transfer column to facilitate interaction between fluids when they are flowing within the mass transfer column, said tray comprising:
    a tray deck having an upper surface;
    an inlet area on the tray deck for receiving a downward flow of liquid onto the upper surface of the tray deck;
    an active area of the tray deck defined by a plurality of apertures distributed across the tray deck and extending through the tray deck to permit upward passage of fluid through the tray deck for interaction with the liquid after it leaves the inlet area and flows across and above the active area of the tray deck;
    an outlet positioned remotely from the inlet area on the tray deck for allowing removal of liquid from the upper surface after it has flowed from the inlet area and interacted with the fluid passing upwardly through the apertures in said area;
    a downcomer extending downwardly from the outlet to receive liquid when it enters the outlet and then convey it downwardly; and
    a plurality of barriers positioned in the active area of the tray deck between the inlet area and the outlet and extending upwardly from the upper surface of the tray deck and across a flow path of the liquid when it flows from the inlet area to the outlet,
    wherein said barriers each comprise pickets for impeding the flow of the liquid as it flows from the inlet area to the outlet and said barriers are positioned so that portions of the active area are on opposite sides of each of said barriers,
    wherein adjacent ones of the pickets are spaced apart to form openings in the spacing between the adjacent ones of the pickets for allowing passage of the liquid successively through the barriers as it flows from the inlet area to the outlet,
    wherein said pickets in adjacent ones of the barriers are offset from each other.

2. The tray of claim 1, including another barrier extending upwardly from the upper surface of the tray deck and positioned adjacent the outlet to function as an outlet weir.

3. The tray of claim 2, wherein said tray deck has an outer perimeter that lies along portions of a circle and wherein each of said barriers extends chordally between opposite sides of said outer perimeter of the tray deck.

4. The tray of claim 3, wherein said pickets in each of said barriers are interconnected at their top and bottom regions or at their top region but not their bottom region.

5. The tray of claim 4, wherein said barriers extend in parallel relationship to each other.

6. The tray of claim 5, wherein said pickets are rectilinear and are uniformly sized.

7. The tray of claim 6, wherein said openings are rectilinear and are uniformly sized.

8. The tray of claim 6, wherein said outlet is positioned such that the downcomer is a side downcomer that is positioned at one end of the tray deck and extends chordally between said opposite sides of the tray deck.

9. The tray of claim 5, including:
    additional ones of said inlet area and said outlet;
    additional ones of said downcomer extending downwardly from said additional outlets;
    additional ones of said outlet weir associated with said additional ones of said outlet; and
    additional barriers extending upwardly from the upper surface of the tray deck and positioned in an active area of the tray deck between the additional ones of said inlet area and the additional ones of said outlet.

10. The tray of claim 9, wherein said additional ones of said downcomer extend chordally between said opposite sides of the tray deck.

11. A mass transfer column comprising a shell, an open internal region within said shell, and plural ones of the tray of claim 1 positioned in vertically spaced-apart relationship within and extending across a cross-section of the open internal region.

12. The mass transfer column of claim 11, wherein said barriers extend chordally between opposite sides of an outer perimeter of the tray deck and in parallel relationship to each other.

13. The mass transfer column of claim 12, wherein in each of said plurality of trays another barrier extends upwardly from the tray deck and is positioned adjacent the outlet to function as an outlet weir.

14. The mass transfer column of claim 13, wherein said barriers are multi-chordal.

15. The mass transfer column of claim 14, wherein said pickets are rectilinear, are uniformly sized and have a height of at least one-half of the vertical spacing between adjacent ones of the tray decks.

16. The mass transfer column of claim 13, wherein in each of said plurality of trays said outlet is positioned such that the downcomer is a side downcomer that is positioned at one end of the tray deck and extends chordally between said opposite sides of the tray deck.

17. The mass transfer column of claim 13, including in each of said plurality of trays:
    additional ones of said inlet area and said outlet;
    additional ones of said downcomer extending downwardly from said additional ones of said outlet and chordally between said opposite sides of the tray deck;
    additional ones of said outlet weir associated with said additional ones of said outlet; and
    additional barriers extending upwardly from the upper surface of the tray deck and positioned in an active area of the tray deck between the additional ones of said inlet area and the additional ones of said outlet.

18. A method of interacting fluids on and above an upper surface of the tray decks of plural ones of the tray of claim 1 positioned in vertically spaced-apart relationship within a mass transfer column and extending across a cross section of an open internal region formed by a shell of the mass transfer column, the method comprising the steps of:
- delivering a liquid onto the inlet area of each of plural ones of the tray and allowing it to flow along and above the upper surface of the tray deck along a flow path from the inlet area, through the openings in the spacing between adjacent ones of the pickets, and then into the outlet,
- wherein the pickets impede said flow of the liquid and increase liquid loading on the tray deck upstream from the pickets;
- causing a vapor to ascend through the apertures in the tray deck of each of the plural ones of the tray to interact with the liquid as it flows along the flow path;
- removing the liquid from the tray deck of each of the plural ones of the tray at the end of its flow path by directing it through the outlet and into the downcomer; and
- then discharging the liquid from the downcomer of each of the plural ones of the tray onto the inlet area of an adjacent underlying one of the trays.

19. The method of claim 18, wherein said liquid flows at a flow rate to produce an outlet weir load of less than 25 gpm/ft.

20. The tray of claim 1, wherein said tray is a single-pass tray and the inlet area and the outlet are located at opposite ends of the tray.

21. The mass transfer column of claim 11, wherein each of said plural ones of said tray is a single-pass tray and the inlet area and the outlet are located at opposite ends of the tray deck.

* * * * *